United States Patent

Tinguee, Jr.

(10) Patent No.: US 6,852,147 B2
(45) Date of Patent: Feb. 8, 2005

(54) APPARATUS AND METHOD FOR REDUCTION OF GASES EMITTED FROM A COOLING TOWER

(76) Inventor: Larry B. Tinguee, Jr., 5702 Purple Sage, Houston, TX (US) 77049

(*) Notice: Subject to any disclaimer, the term of this patent is extended or adjusted under 35 U.S.C. 154(b) by 0 days.

(21) Appl. No.: 10/118,700

(22) Filed: Apr. 10, 2002

(65) Prior Publication Data

US 2004/0118280 A1 Jun. 24, 2004

(51) Int. Cl.⁷ .............................................. B01D 47/00
(52) U.S. Cl. ........................ 95/273; 95/288; 55/315.2; 55/340; 96/266; 261/5; 261/152; 261/DIG. 11; 165/113; 165/900
(58) Field of Search ............................... 55/315.2, 340, 55/428.1, 466, DIG. 17, DIG. 23; 96/240, 242, 266, 300, 355; 165/112, 113, 900; 261/127, 128, 140.1, 152, 153, DIG. 11, DIG. 77, 5; 95/288, 273

(56) References Cited

U.S. PATENT DOCUMENTS

| | | | | |
|---|---|---|---|---|
| 3,915,223 A | * | 10/1975 | Kelp | 165/111 |
| 4,022,853 A | * | 5/1977 | Schulenberg | 261/23.1 |
| 5,449,036 A | * | 9/1995 | Genge et al. | 165/104.19 |
| 6,247,682 B1 | * | 6/2001 | Vouche | 261/152 |
| 6,394,174 B1 | * | 5/2002 | Hsieh | 165/47 |
| 6,663,087 B2 | * | 12/2003 | Hubbard et al. | 261/152 |
| 6,663,694 B2 | * | 12/2003 | Hubbard et al. | 95/288 |
| 2003/0209020 A1 | * | 11/2003 | Klein | 62/183 |

* cited by examiner

Primary Examiner—Scott Bushey
(74) Attorney, Agent, or Firm—Kenneth D. Baugh

(57) ABSTRACT

A gas reduction apparatus 12 is provided for reducing the amount of gas 15 emitted from a cooling tower 10 into the atmosphere. The apparatus 12 in accordance with the principles of this invention includes a first air conduit 13 which collects the gas 15 and chemical particles therein released from the cooling tower 10 before they are released into the atmosphere. The conduit 13 then provides a path for the gas 15 and chemical particles formed therein to flow to a liquefier 16. The liquefier 16 converts the gas 15 to a liquid 17. A filter 32 is coupled adjacent the liquefier 16 to separate the chemical particles released into the liquefier from the liquid 17 formed in the liquefier. The liquid 17 is then directed through an outlet conduit 34 to a cooling tower reservoir 36 where it finds itself back into the cooling tower 10.

8 Claims, 2 Drawing Sheets

APPARATUS AND METHOD FOR REDUCTION OF GASES EMITTED FROM A COOLING TOWER

TECHNICAL FIELD

This invention relates to cooling towers and more particularly to an apparatus for reducing the vapor and other gases omitted from cooling towers. When cooling towers are operating vapor/gases and chemical particles are released into the atmosphere. These components released into the atmosphere produce unwanted pollution which ultimately adversely effects plant and animal life. These emissions can contribute to causing a number of severe health problems such as the chronic respiratory problems some human beings suffer today.

Because of the ongoing health concerns and the other adverse effects on plant and animal life many regulations have been created to reduce such emissions.

Cooling towers are widely used in industry today. Because of the widespread use of cooling towers there is an ongoing concern to make sure that emission regulations are complied with. As a result there is an ongoing search for methods to maintain or gain compliance with regulations on reducing such emissions.

BACKGROUND OF THE PRIOR ART

The technologies that have been utilized to address the reduction of emissions from cooling towers have been more concerned with preventing the formation of clouds of gas or smoke on cooling towers. The primary motivation for elimination of such clouds has been the considerable annoyance these steam clouds create for street, railway and air traffic.

One such technique for preventing the formation of clouds of gas formed on cooling towers is disclosed in U.S. Pat. No. 3,846,519. In this technique for preventing the formation of clouds on cooling towers cooling water for cooling the substance to be cooled is passed in one direction over cooling insert means while cooling air is passed in the opposite direction in counter current flow thereto and in heat exchange therewith for cooling the water. The obtained exhaust air of the cooling tower is then prior to leaving the cooling tower intermixed with a separately heated-up gaseous medium thus preventing cloud formation.

This technique requires that proper instruments and flow controls be put in place in the cooling tower. Because of the need for proper instruments and flow controls existing cooling towers would have to be modified. Accordingly capital investment will be required to implement this technique successfully.

DISCLOSURE OF THE INVENTION

An improved system for reducing gases and chemical particles emitted from a cooling tower into the atmosphere is provided. The system in accordance with the principles of this invention includes a first means for collecting gases and chemical particles released from the cooling tower before they are released into the atmosphere and for facilitating the passage of the gases and chemical particles along a predetermined path. A second means coupled to the first means is provided for converting the gas released into the first means from gas to liquid. A filtering means coupled to the second means is provided for isolating the chemical particles, released into the first means from the resulting liquid formed in the second means. Still further a means is provided for directing the liquid formed in the second means to a cooling tower water source.

BRIEF DESCRIPTION OF THE DRAWING

The details of the invention will be described in connection with accompanying drawing in which.

BEST MODE FOR CARRYING OUT THE INVENTION

Figure 1:
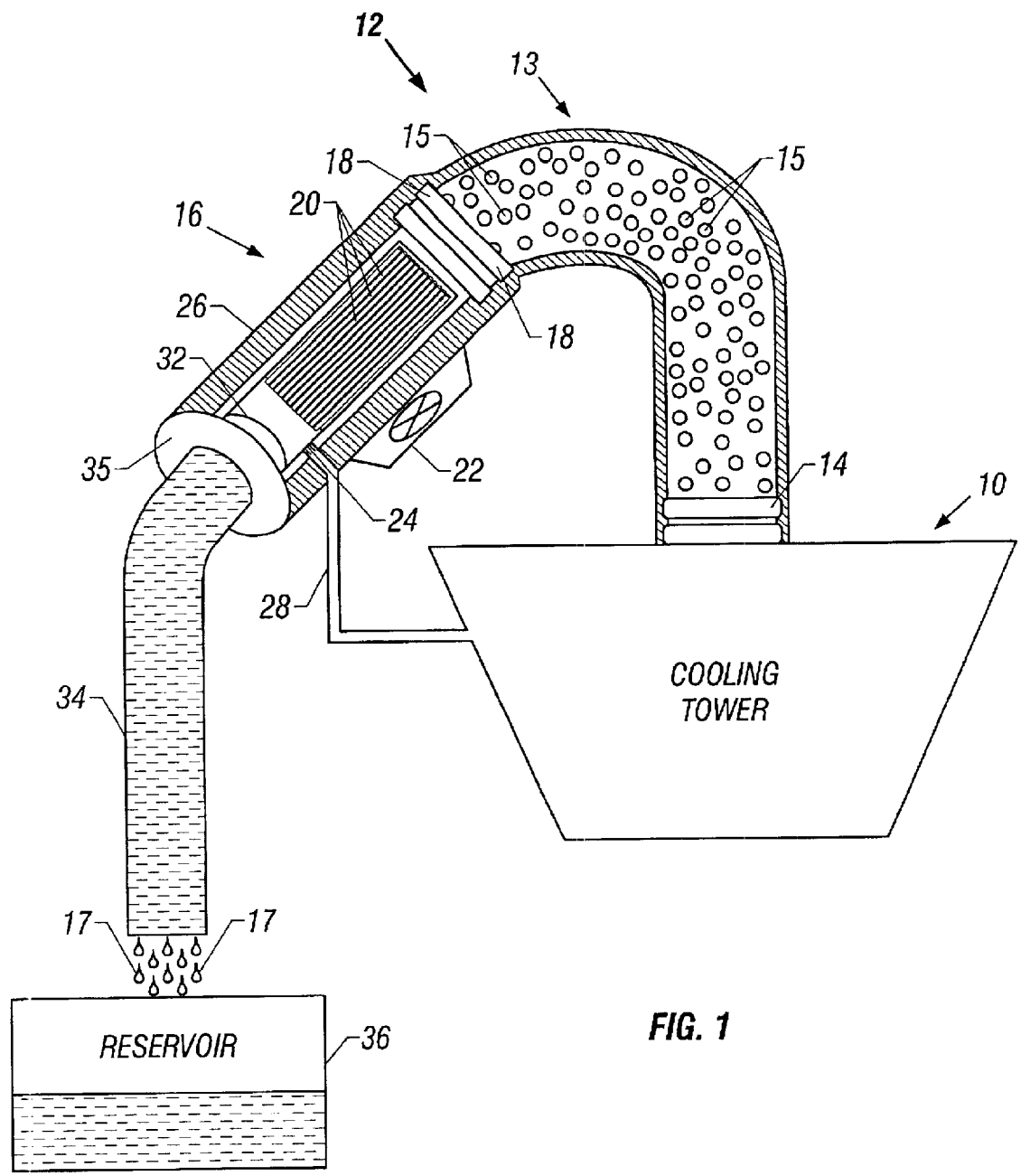
FIG. 1 is a front cross-sectional view of the apparatus and cooling tower in accordance with the principles of the invention.
Figure 2:
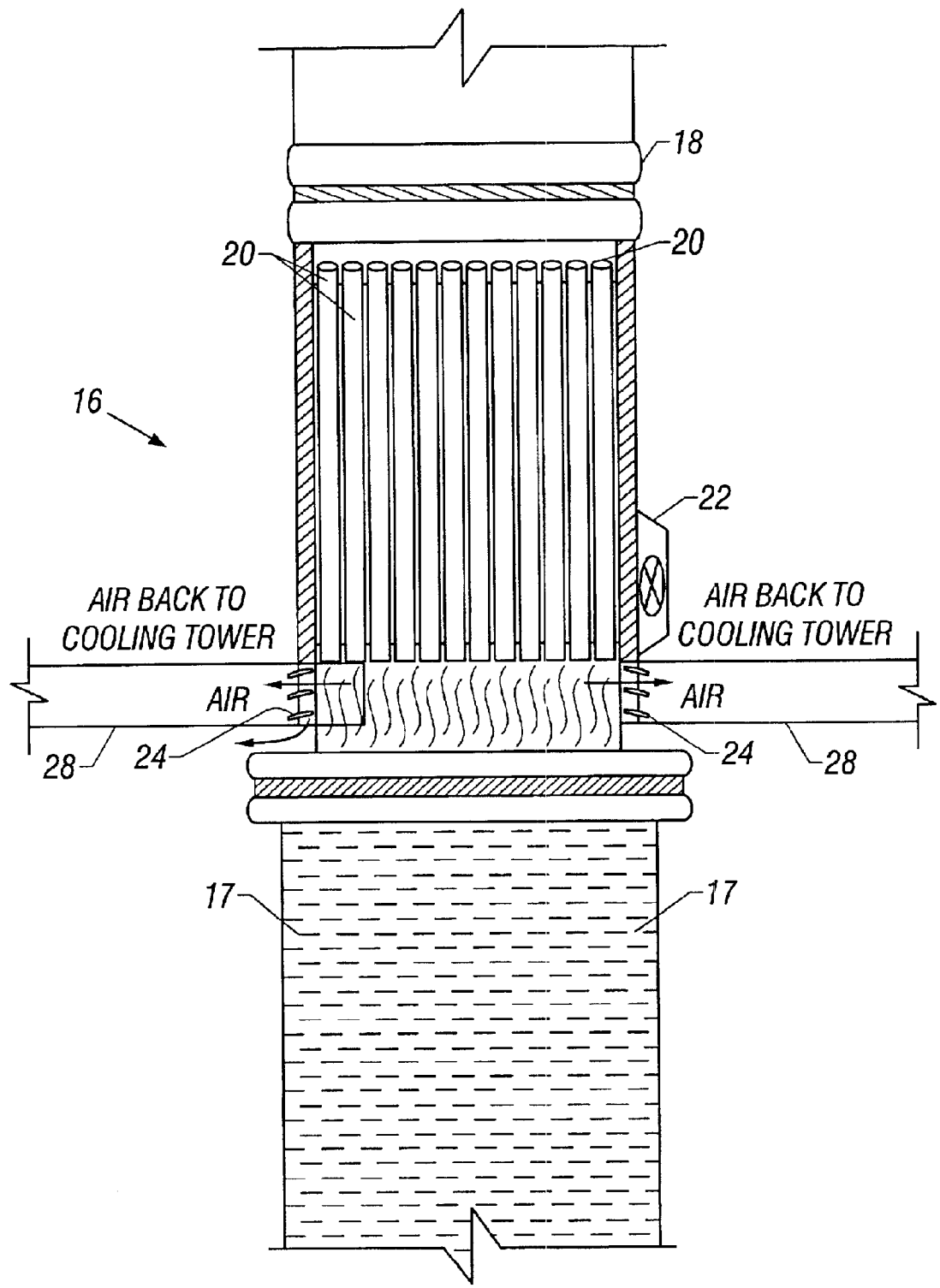
FIG. 2 is a fragmented cross sectional view of a gas to liquid converter of the apparatus and cooling tower in accordance with the principles of the invention.

Referring to FIGS. 1 and 2, a cooling tower, generally designated by the numeral 10 is provided. The cooling tower 10 is provided with a gas or vapor reduction apparatus, generally designated, by the numeral, 12. The gas reduction apparatus 12 is provided with an air conduit 13. The air conduit 13 is coupled to an uppermost portion of the cooling tower 10 by a coupling member 14. The air conduit 13 is provided to collect a vapor or gas 15, which includes chemical particles, released from the cooling tower 10, before it is released into the atmosphere and then direct the gas and chemical particles in a predetermined direction therein. The air conduit 13 is designed in a well known manner so that it confines the gas 15 and chemical particles from the cooling tower 10 within the conduit thereby keeping the gas and chemical particles from reaching the atmosphere as it exits the cooling tower. The conduit 13 may for example, be made, of a duct like material or carbon steel tubing or piping.

The gas reduction apparatus 12 is also provided with a liquefier apparatus, generally designated, by the numeral 16 (FIG. 2). The liquefier apparatus 16 is coupled to the conduit 12 at a lowermost portion thereof by a coupling member 18. The liquefier apparatus 16 is provided with a plurality of cooling tubes 20 (FIG. 2) and a compressor or chiller system 22. The liquefier apparatus 16 is a large refrigeration cooling system that functions on the same principle as the ordinary refrigeration system and water condensers. As a result the gas 15 flowing into the liquefier apparatus 16 is converted to liquid 17 therein in a well known manner.

The liquefier apparatus 16 is also provided with venting ports 24 (FIG. 2) formed in a wall 26 thereof. The venting ports 24 include well known venting apparatus (not shown) for allowing the vents to be opened and closed. The venting ports 24 allows air to flow from the liquefier apparatus 16. Venting conduits 28 are coupled from the venting ports 24 to the cooling tower 10 so that air from the liquefier 16 may feed back to the cooling tower cells to facilitating temperature control in the cooling tower.

The gas reduction apparatus 12 is also provided with a filter 32. The filter 32 is located adjacent to a lowermost portion of the liquefier apparatus 16. The filter 32 is provided to isolate any solid chemical particles remaining in the liquefier 16 from the liquid 17 formed therein. The filter 32 may be a standard filter which functions in a well known manner with appropriate dimensions to be coupled adjacent the liquefier 16.

An outlet conduit 34 is provided which is coupled by a coupling member 35 to the liquefier 16 adjacent the filter 32. The outlet conduit 34 is provided to establish a return path for the liquid 17 which comes from the liquefier 16 to return to a reservoir 36 or other source of water being utilized by the cooling tower 10.

When the cooling tower 10 is in operation gas 15 and chemical particles normally released from the cooling tower into the atmosphere are released into the air conduit 13 of the gas reduction apparatus 12. The gas 15 and chemical particles are then directed into the liquefier apparatus 16. Once in the liquefier apparatus 16 the gas 15 is converted into liquid (water) 17 and any remaining chemical particles are contained in the filter 32. The liquid 17 formed in the liquefier 16 then travels from the liquefier 16 through the conduit 34 to the cooling tower reservoir 36. As a result gas and chemical particles from the cooling tower 10 are not released into the atmosphere.

It should be understood that principles of this invention may be applied to cooling towers of different sizes and types without departing from the spirit and scope of the invention.

It should be further understood that various changes and modifications can be made to the invention without departing from the spirit of the invention as defined in the claims.

What is claimed is:

1. A method of reducing gas and chemical particles emitted from a cooling tower into the atmosphere including the steps of:
    collecting gas and chemical particles released from a cooling tower before they are released into the atmoshere;
    converting the collected gases released from the cooling tower to liquid;
    separating the chemical particles from the liquid; and
    facilitating the movement of the liquid to a cooling tower water source so that the liquid can be fed back to the cooling tower.

2. An apparatus for reducing gas and chemical particles emitted from a cooling tower into the atmosphere including:
    a first means for collecting gas and chemical particles released from the cooling tower before they are released into the atmosphere and for directing the gas and chemical particles along a predetermined path;
    a second means coupled to the first means for converting the gas in the first means from gas to liquid;
    a filtering means coupled to the second means for separating the chemical particles released into the first means from the cooling tower from the liquid formed in the second means; and
    a third means for facilitating the movement of the liquid formed in the second means along a predetermined path to a cooling tower water source.

3. An apparatus as defined in claim 2 further including a fourth means for facilitating the passage of air from the first means back to the cooling tower.

4. An apparatus as defined in claim 3 wherein the first means for collecting gas and chemical particles and for facilitating the passage of gas and chemical particles along a predetermined path includes a conduit which keeps the gas and chemical particles out of the atmosphere and allows the gas and chemical particles to flow along a predetermined path therein.

5. An apparatus as defined in claim 4 wherein the second means for converting gas includes a plurality of cooling tubes and a compressor.

6. An apparatus as defined in claim 5 wherein the filtering means includes a filter coupled adjacent to lowermost portions of the cooling tower.

7. An apparatus as defined in claim 6 wherein the third means for facilitating the movement of liquid from the second means to a cooling tower water source includes a conduit coupled to the second means.

8. An apparatus as defined in claim 7 wherein the fourth means for facilitating the passage of air from the first means back to the cooling tower includes a venting apparatus in the second means and a venting conduit coupled between the venting apparatus and the cooling tower.

* * * * *